United States Patent [19]

Stoufer

[11] E Patent Number: Re. 33,210

[45] Reissued Date of Patent: May 8, 1990

[54] CLEANING COMPOSITION OF TERPENE HYDROCARBON AND A COCONUT OIL FATTY ACID ALKANOLAMIDE HAVING WATER DISPERSED THEREIN

[76] Inventor: Wilmer B. Stoufer, 8133 Naranja Dr., Jacksonville, Fla. 32217

[21] Appl. No.: 131,730

[22] Filed: Dec. 11, 1987

Related U.S. Patent Documents

Reissue of:

[64] Patent No.: 4,704,225
Issued: Nov. 3, 1987
Appl. No.: 858,389
Filed: May 1, 1986

[51] Int. Cl.[5] ..... C11D 1/18

[52] U.S. Cl. ..... 252/153; 252/171; 252/309; 252/548; 134/40

[58] Field of Search ..... 252/153, 171, 309, 548; 134/40

[56] References Cited

U.S. PATENT DOCUMENTS

| | | | |
|---|---|---|---|
| 4,254,104 | 3/1981 | Sujuki | 252/316 |
| 4,414,128 | 11/1983 | Goffinet | 252/153 |
| 4,438,009 | 3/1984 | Brusky et al. | 252/171 |
| 4,533,487 | 8/1985 | Jones | 252/171 |
| 4,561,991 | 12/1985 | Herbots et al. | 252/153 |
| 4,594,111 | 6/1986 | Cooncern | 252/548 |
| 4,675,125 | 6/1987 | Sturwold | 252/153 |

FOREIGN PATENT DOCUMENTS 2033421 5/1980 United Kingdom .

*Primary Examiner*—Josephine Barr

[57] ABSTRACT

There is provided a composition especially useful to remove old wax, grease, oils, or fats easily. The composition is a water-in-oil emulsion of a terpene hydrocarbon and a coconut oil fatty acid alkanolamide in water characterized by stability and easy biodegradability.

19 Claims, No Drawings

CLEANING COMPOSITION OF TERPENE HYDROCARBON AND A COCONUT OIL FATTY ACID ALKANOLAMIDE HAVING WATER DISPERSED THEREIN

Matter enclosed in heavy brackets [ ] appears in the original patent but forms no part of this reissue specification; matter printed in italics indicates the additions made by reissue.

This invention relates, as indicated, to cleaning compositions which are especially useful for removing waxes, fats, oils, and greases and difficultly removable materials such as Bunker C oil or other crude oil compositions. The composition is a water-in-oil emulsion. It is characterized by a relatively short BOD compared to, for example, petroleum derived solvent compositions.

BACKGROUND OF THE INVENTION AND PRIOR ART

In order to impact a protective coating and/or to improve the appearance of many surfaces, it has been customary in the past to apply a wax coating. These coatings are by no means permanent and, where exposed to elements such as weather, salt, human traffic, etc., the wax surface gradually becomes flawed or disappears entirely. Prior to applying a new wax coating, it has been found desirable to remove the weathered or worn wax with a solvent or solvent composition. Many of the solvents which are available for this purpose have a tendency to deleteriously affect the substance, particularly where the substrate is a painted or other organic chemical material, as for example the surface of an automobile. To overcome these problems, the prior art has developed various emilsion compositions which are based primarily upon the use of petroleum derived hydrocarbons, e.g., kerosene, petroleum distillates, e.g., n-hexane, etc. While these materials are quite effective to remove wax from a surface, they are environmentally undersirable, principally because of the prolonged BOD, e.g., up to 40 days in duration.

I have now found that a highly effective cleaning composition especially suited for removal of wax or wax-like materials from surfaces can be prepared using a natural material, e.g., a terpene hydrocarbon material, such as citrus limonene, alpha-pinene beta-pinene, or delta-3-carene. This material together with a suitable dispersing agent described below is dispersed in an aqueous medium in the form of a water-in-oil emulsion. In this form, the oil phase comes immediately into contact with the wax or other organic substance to be removed, and because of the high solvency power of the terpene hydrocarbon is able very quickly to dissolve the old surface coating including oils, fats, waxes and greases. Because the emulsion is a water-in-oil emulsion and has suitable rheological properties when on the surface even though vertically disposed, and does not "run". After a suitable contact time, additional water can be added to the surface, usually in the form of a spray which causes an inversion of the emilsion to an oil-in-water emulsion whereby the cleaning compositions is readily removed from the surface.

BRIEF STATEMENT OF THE INVENTION

Briefly stated, the present invention is in a composition of matter consisting essentially of a water-in-oil emulsion of (a) an oil phase consisting essentially of from about 95 to 85 parts by volume of an unsaturated terpene hydrocarbon and from about 5 to 15 parts by volume of the condensation product of from 1.5 to 3.0 moles of a mono-, di-, or trialkylolamine with 1 mole of a $C_8$–$C_{10}$ fatty acid, or fatty acid mixture of two more fatty acids containing from 8 to 18 carbon atoms and (b) from 5 to 8 parts by volume of water per part by volume of component (a). The composition of the present invention may contain small amounts, i.e., less than 10% by volume of additional ingredients which do not adversely effect the matter in which the water-in-oil emulsion operates. Such materials include emulsion stabilizers, such as ordinary cornstarch, hydroxymethylcellulose, or fungicides, bactericides, or mildewcides, colorants, antioxidants, ordorants, or mixtures thereof and the like. The terpene hydrocarbon materials at the recommended concentrations have a pleasant citrusy odor, and normally odorant components or masks are not necessary.

DETAILED DESCRIPTION OF THE INVENTION AND SPECIFIC EXAMPLES

As indicated above, the compositions of the present invention contain 3 essential ingredients: (a) an unsaturated terpene hydrocarbon, preferably an unsaturated cyclic terpene hydrocarbon containing 10 carbon atoms and selected from limonene or dipentene, alpha-pinene, beta-pinene, mixtures of alpha- and beta-pinene, carene, etc.; (b) a water soluble amide of a coconut oil fatty acid or mixture of coconut oil fatty acids; and (c) water.

The unsaturated tepene hydrocarbon solvents of the present invention are derivatives of pine tree products or citrus by products, and, therefore, are naturally occuring materials. These hydrocarbons can be used alone or as mixtures. A readily available, inexpensive unsaturated hydrocarbon, and one which is preferred for use in accordance herewith is citrus limonene or dipentene. Turpentine which is a mixture of predominately alpha- and bets-pinene may also be used. Aplha- and beta-pinene may also be used individually as the solvent ingredient for the oil phase. The various carene isomers may be used as a mixture or as individual components, e.g., delta-3-carene. Numerous other unsaturated terpene hydrocarbons are known to those skilled in the art and may be used herein. However, those mentioned above are the most readily available and least expensive.

The second essential component of the cleaning compositions hereof is an alkanolamide derivative of a fatty acid or other vegetable fatty acids or a mixture of fatty acids. Coconut oil fatty acids are preferred and include caprylic (about 8% of the fatty acids naturally occuring in coconut oil), capric acid (about 7%), lauric acid (about 48%), myristic acid (about 17.5%), palmitic acid (about 8.2%), stearic acid (about 2%), oleic acid (about 6%), and linoleic acid (about 2.5%). The fatty acids containing from 8 to 18 carbon atoms, and particularly lauric acid are preferred.

Reference may be had to the patent to Kritchevsky U.S. Pat. No. 2,089,212 dated Aug. 10, 1937 for details of the preparation of coconut oil fatty acid alkanolamides useful in accordance with the present invention. The preferred coconut oil fatty acid alkanolamide useful herein is that produced by condensing 2 moles of diethanolamine with 1 mole of the fatty acid mixture derived from coconut oil. U.S. Pat. No. 2,089,212, supra, is incorporated herein by reference thereto.

A typical example of an emulsifying agent useful herein is prepared by reacting 1 mole of coconut oil fatty acids with 2 moles of diethanolamine at a temperature of from 145° C. to 200° C. for a few hours. The resulting condensate is soluble in water and has excellent properties as an emulsifying agent. (See Examples 3 and 4 of U.S. Pat. No. 2,089,212). Instead of diethanolamine, equivalent quantities of monoethanolamine or triethanolamine may be used. Reference may also be had to U.S. Pat. No. 3,373,173 to Foley et al dated Mar. 12, 1968 which discloses a modified (phthalic anhydride) coconut oil fatty acid alkanol amide.

The third essential ingredient of the compositions of the present invention is water. Ordinary tap water, or distilled water, or deionized water may be used. Clearly ordinary tap water is preferred for the reason of low cost. The insignificant amounts of dissolved impurities in tap water do not appear to affect adversely the compostions hereof for their intended purpose.

Optional components such as emulsion stabilizing agents may be included although it has been found that emulsions made of the foregoing 3 essential ingredients in the proportions stated below are stable over long periods of time at ambient temperatures above about 50° F. Where lower temperatures are encountered, it may be found desirable to include an emulsion stabilizing ingredient. It has been found that common cornstarch in an amount of from 1 to 2 ounces per gallon of emulsion is highly effective for this purpose. A much smaller quantity, e.g., 0.1 to 0.2 parts by volume of hydroxymethylcellulose per gallon of water is very effective. Other stabilizing agents such as gum arabic may also be used. Where the emulsion is freshly prepared and used directly, such stabilizers have been found necessary, However if several days to several months are to elapse before use, inclusion of a stabilizer or anti-oxidant is desirable for best results.

Other nonessential ingredients for purposes of conferring desired properties such as odor control, resistance to fungus growth, resistance to mildew growth, etc. may be included. The amount of these ingredients ranges generally from about 0.1 to 1% by volume.

The emulsion of the present invention are very easily fabricated. All that is necessary is to dissolve the fatty acid alkanolaminde in water and add the unsaturated terpene hydrocarbon thereto with vigorous stirring as with an ordinary Waring blender. Although an oil-in-water emilsion may be first formed, when the composition is diluted with water to the desired concentration, the emulsion will spontaneously invert to a water-in-oil emulsion which is the preferred form for use in accordance herewith.

It has been found that for best results, the water-in-oil emulsion hereof contain 1 part by volume of the organic phase and from 5 to 8 parts by volume, preferably 6 to 7 parts by volume of water. The ratio of unsaturated terpene hydrocarbon to fatty acid alkanolamide is desirably within the range of from 95 to 85 percent by volume of the terpene hydrocarbon and 5–15 percent by volume of coconut oil fatty acid alkanolamide. Especially satisfactory results are obtained when the ratio of unsaturated terpene hydrocarbon to fatty acid alkanolamide is 90:10 by volume.

It becomes convenient at this point to illustrate the invention by giving specific examples of water-in-oil emulsion in accordance with the present invention. Example 1 below is the best mode of carrying out the present invention. The emulsion were made using a Waring blender for period of about 5 to 15 minutes at room temperature.

| | |
|---|---|
| **EXAMPLE 1** | |
| Limonene | 90 parts by volume |
| Coconut Oil Fatty Acid diethanolamide | 10 parts by volume |
| Water | 550 parts by volume |
| **EXAMPLE 2** | |
| Limonene | 90 parts by volume |
| Coconut Oil Fatty Acid diethanolamide | 10 parts by volume |
| Water containing 0.1 part by volume/gal. of water of hydroxyethylcellulose | 550 parts by volume |
| **EXAMPLE 3** | |
| Limonene | 85 parts by volume |
| Coconut Oil Fatty Acid diethanolamide | 15 parts by volume |
| Water | 550 parts by volume |
| **EXAMPLE 4** | |
| Limonene | 95 parts by volume |
| Coconut Oil Fatty Acid diethanolamide | 5 parts by volume |
| Water | 550 parts by volume |
| **EXAMPLE 5** | |
| Alpha-pinene | 90 parts by volume |
| Coconut Oil Fatty Acid diethanolamide | 10 parts by volume |
| Water | 500 parts by volume |
| **EXAMPLE 6** | |
| Beta-pinene | 90 parts by volume |
| Coconut Oil Fatty Acid diethanolamide | 10 parts by volume |
| Water | 700 parts by volume |
| **EXAMPLE 7** | |
| Delta-3-carene | 85 parts by volume |
| Coconut Oil Fatty Acid diethanolamide | 15 parts by volume |
| Water | 800 parts by volume |

Example 2 represents the best mode of carrying out my invention.

Water-in-oil emulsion having compositions such as illustrated above have been found highly effective in removing materials such as Bunker C oil, paraffin wax, roofer's cement, carnauba wax, beeswax, automobile wax compositions, surfboard wax and ski wax compositions, lipstick composition, vegetable, and animal type oils, fats, greases and the like. The mode of wax removal contemplates for best results simply spraying the emulsion onto the surface coated with the material it is desired to remove, allowing the emulsion to remain in contact with the material to be removed for a period of from about 3 to 10 minutes, and then applying by spray means as from an ordinary garden hose, tap water in an amount sufficient to wash off the emulsion together with the old coating material. In some cases such as in the case of Bunker C oil, it may be found desirable to make a second application of the emulsion. Bunker C oil is one of the most difficult materials to remove from a surface it being highly resistant to all known solvents. When the substrate is a painted metal surface, such as the body of an automobile, the emulsion of the present invention have been found to have no effect upon the substrate, particularly where the varnish is a urethane type varnish. These materials may also be used to remove furniture wax without damaging the varnished substrate.

The inclusion of a small amount of a stabilizer such as mentioned above has been found to smooth out the film of water-in-oil emulsion which is spray applied. Thus, one to two ounces of cornstarch per gallon of emulsion will also confer desired rheological properties on the spray applied film.

What is claimed is:

1. A composition of matter consisting essentially of an water-in-oil emulsion of (a) an oil phase consisting essentially of from about 95 to 85 parts by volume of an unsaturated terpene hydrocarbon and from about 5 to 15 parts by volume of the condensation product of from 1.5 to 3 moles of a mono-, di-, or trialkylolamine with 1 mole of a fatty acid containing 8 to 18 carbon atoms or a mixture of such fatty acids, and (b) from 5 to 8 parts by volume of water per part by volume of component (a).

2. A composition as defined in claim [1] *19* wherein the unsaturated terpene hydrocarbon contains 10 carbon atoms.

3. A composition as defined in claim 2 wherein the terpene hydrocarbon is limonene.

4. A composition as defined in claim 2 wherein the terpene hydrocarbon is pinene.

5. A composition as defined in claim 4 wherein the pinene is alpha-pinene.

6. A composition as defined in claim 4 wherein the pinene is beta-pinene.

7. A composition as defined in claim 2 wherein the terpene hydrocarbon is carene.

8. A composition as defined in claim 7 wherein the carene is delta-3-carene.

9. A composition as defined in claim [1] *19* wherein the alkanolamine has the general formula:

$$(HO—R)_n—N—H_{(3-n)}$$

wherein R is an alkyl group containing from 1 to 6 carbon atoms and n is 1, 2, or 3.

10. A composition as defined in claim 9 wherein the alkyl group is ethyl.

11. A composition as defined in claim 9 wherein n is 1.

12. A composition as defined in claim 10 wherein n is 2.

13. A composition as defined in claim 9 wherein the alkylolamine is diethanolamine.

14. A composition as defined in claim [1] *19* wherein the condensation product is coconut oil fatty acid diethanolamide.

15. A composition as defined in claim [1] *19* wherein component (a) is composed of 90 parts by volume of limonene and 10 parts by volume of coconut oil fatty acid diethanolamide, and component (b) is present in an amount of about 6 parts by volume per part of component (a).

16. A composition as defined in claim [1] *19* further characterized by the presence therein of 0.1 to 3% by volume of a stabilizer.

17. A composition as defined in claim 16 wherein the stabilizer is cornstarch.

18. A composition as defined in claim 16 wherein the stabilizer is hyroxyethylcellulose.

*19. A composition of matter consisting essentially of a water-in-oil emulsion of (a) an oil phase consisting essentially of from about 95 to 85 parts by volume of and unsaturated terpene hydrocarbon and from 5 to 15 parts by volume of the condensation product of from 1.5 to 3 moles of mono-, di-, or trialkylolamine with 1 mole of fatty acid containing 8 to 18 carbon atoms or a mixture of such fatty acids, and (b) water.*

* * * * *